United States Patent
Lee

(10) Patent No.: US 8,589,988 B2
(45) Date of Patent: Nov. 19, 2013

(54) METHOD FOR SWAPPING SINK DEVICE AND APPARATUS FOR PROVIDING CONTENTS USING THE SAME

(75) Inventor: Jeong-hun Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 12/947,448

(22) Filed: Nov. 16, 2010

(65) Prior Publication Data

US 2011/0164180 A1 Jul. 7, 2011

(30) Foreign Application Priority Data

Jan. 5, 2010 (KR) .................. 10-2010-0000445

(51) Int. Cl.
*H04N 7/18* (2006.01)
(52) U.S. Cl.
USPC .................. 725/74; 725/75; 725/76; 725/77; 725/78; 725/79; 725/80; 725/81; 725/82; 725/83; 725/84; 348/520; 348/521; 348/522; 348/523; 348/524
(58) Field of Classification Search
USPC .............................. 725/74; 348/521, E05.011
See application file for complete search history.

(56) References Cited

U.S. PATENT DOCUMENTS

| | | | |
|---|---|---|---|
| 6,611,537 B1 * | 8/2003 | Edens et al. | 370/503 |
| 7,545,935 B2 * | 6/2009 | Claussen | 380/200 |
| 7,667,774 B2 * | 2/2010 | Murakami | 348/500 |
| 7,861,272 B2 * | 12/2010 | Russ et al. | 725/74 |
| 2005/0097623 A1 * | 5/2005 | Tecot et al. | 725/136 |
| 2005/0216942 A1 * | 9/2005 | Barton | 725/97 |
| 2006/0080703 A1 * | 4/2006 | Compton | 725/34 |
| 2006/0117354 A1 * | 6/2006 | Schutte et al. | 725/78 |
| 2009/0241149 A1 * | 9/2009 | Yoshioka et al. | 725/87 |
| 2010/0169912 A1 * | 7/2010 | Limbasia | 725/25 |
| 2010/0306811 A1 * | 12/2010 | Adimatyam et al. | 725/110 |
| 2010/0313225 A1 * | 12/2010 | Cholas et al. | 725/62 |
| 2011/0138064 A1 * | 6/2011 | Rieger et al. | 709/228 |
| 2011/0162013 A1 * | 6/2011 | Bagasra et al. | 725/74 |
| 2012/0117585 A1 * | 5/2012 | Curtis et al. | 725/25 |

FOREIGN PATENT DOCUMENTS

| | | |
|---|---|---|
| EP | 1596594 A1 | 11/2005 |
| JP | 11146426 A | 5/1999 |
| JP | 2000187474 A | 7/2000 |
| JP | 2002-281569 A | 9/2002 |
| JP | 2005-130466 A | 5/2005 |

OTHER PUBLICATIONS

Communication dated Jul. 6, 2012 issued by the European Patent Office in counterpart European Patent Application No. 10193048.5.

* cited by examiner

*Primary Examiner* — Nasser Goodarzi
*Assistant Examiner* — Paul Graham
(74) *Attorney, Agent, or Firm* — Sughrue Mion, PLLC

(57) ABSTRACT

A method for converting a sink device and an apparatus for providing a content using the same are provided. The method for converting the sink device includes receiving a sink device conversion command from a first sink device, transmitting the content to a second sink device if a conversion approval of the sink device is received from the second sink device, and transmitting a control authority related to a content provision from the first sink device to the second sink device.

8 Claims, 5 Drawing Sheets

METHOD FOR SWAPPING SINK DEVICE AND APPARATUS FOR PROVIDING CONTENTS USING THE SAME

CROSS-REFERENCE TO RELATED APPLICATIONS

This application claims priority under 35 U.S.C. §119 from Korean Patent Application No. 2010-0000445, filed on Jan. 5, 2010 in the Korean Intellectual Property Office, the disclosure of which is incorporated herein by reference in its entirety.

BACKGROUND

1. Field of the Invention

Apparatuses and methods consistent with exemplary embodiments relate to providing contents, and more particularly, to providing contents for devices connected to communicate with one another.

2. Description of the Related Art

Prices of electronic devices have been decreasing, but consumer's purchasing power has been increasing. Thus, it has become common for one user to own a number of electronic devices.

Moreover, with the development of digital and networking technologies, one network has been generated by bundling a number of electronic devices. The electronic devices forming the network are mutually operated and generate many new functions which were not possible on an individual basis.

Accordingly, it is necessary to find ways for a user to connect their electronic devices and to enjoy more diverse and convenient functions.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

The present invention provides a method for converting a sink device, which suspends a content transmission to the sink device, transmits the content to another sink device, thus converting a sink device to output the contents, and an apparatus for providing the content using the same.

According to an exemplary embodiment, a sink device conversion method of a plurality of sink devices which output a content transmitted from a source device includes: receiving a sink device conversion command from a first sink device; transmitting the content to a second sink device, if a sink device conversion approval is received from the second sink device; and transmitting a control authority related to a content provision from the first sink device to the second sink device.

The sink device conversion method may further include suspending the transmission of the content to the first sink device after the receiving operation.

The transmitting may include transmitting the content after the moment when the transmission was suspended in the suspension operation.

The sink device conversion method may further include transmitting a turn-off request to the first sink device after the suspension operation.

The sink device conversion method may further include transmitting a turn-on request to the second sink device after the receiving operation.

The sink device conversion command may be a command which makes the source device convert from the first sink device to the second sink device and transmit the content to the second sink device.

The source device is a content-play device which plays contents including at least one of a video signal and an audio signal, and the plurality of sink devices comprise a video device and an audio device. The transmitting of the content comprises separating the contents into a video signal and an audio signal; transmitting the video signal into the video device; and transmitting the audio signal into the audio device.

According to another exemplary embodiment, a content-providing apparatus which converts a sink device outputting a content includes: a communication interface which enables communication between the content-providing apparatus and at least a first sink device and a first sink device; and a control unit which receives a sink device conversion command from the first sink device through the communication interface, transmits the content to the second sink device through the communication interface if a sink device conversion approval is received from the second sink device through the communication interface, and transfers a control authority related to a content provision from the first sink device to the second sink device.

The control unit may suspend content transmission to the first sink device if the sink device conversion command is received from the first sink device.

The control unit may transmit the content to the second sink device through the communication interface after the moment when the transmission was suspended.

The control unit may transmit a turn-off request to the first sink device through the communication interface after suspending the content transmission to the first sink device.

The control unit transmits a turn-on request to the second sink device though the communication interface if the sink device conversion command is received from the first sink device.

The sink device conversion command is a command which makes the content-providing apparatus convert from the first sink device to the second sink device and transmit the content to the second sink device.

The content includes at least one of a video signal and an audio signal, the second sink device includes a video device and an audio device, and the control unit transmits the video signal separated from the content to the video device through the communication interface and transmits the audio signal to the audio device through the communication interface.

According to another exemplary embodiment, a method for converting from one sink device to another sink device includes: transmitting data to the sink device; receiving from the sink device a conversion request; and transmitting data to the other sink device based on the conversion request.

The method may further include suspending the transmission of data to the sink device after the conversion request is received. Also, the method may further include receiving a conversion approval from the other sink device after the conversion request is received.

The method may further include transferring a control authority from one sink device to another sink device.

According to yet another exemplary embodiment, a source apparatus for converting a destination sink device to another destination sink device, includes: a communication interface which transmits content to the destination sink device and receives from the sink device a conversion request; and a control unit which receives and processes the conversion request. The communication interface may transmit the content to the other sink device based on the conversion request.

The control unit may suspend the transmission of data to the sink device after the conversion request is received.

According to an aspect of an exemplary embodiment, a control authority may be transferred from the sink device to the other sink device.

According to another aspect of an exemplary embodiment, the source apparatus may receive a conversion approval from the other device after the conversion request is received.

According to still another exemplary embodiment, a method for converting from a first sink device to another sink device, includes: transmitting data to the sink device; receiving from the sink device a conversion request to transmit data to a second sink device; receiving from a third sink device a conversion approval; and transmitting the data to the third sink device. The method may further include transferring a control authority from the sink device to the third sink device.

According to still another exemplary embodiment, a source apparatus for converting a destination sink device to another destination sink device, includes: a communication interface which transmits data to the destination sink device and receives, from the destination sink device, a conversion request to transmit data to a second destination sink device; and a control unit which receives and processes the conversion request, wherein the communication interface transmits the data to a third destination sink device after receiving a conversion approval from the third destination sink device.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
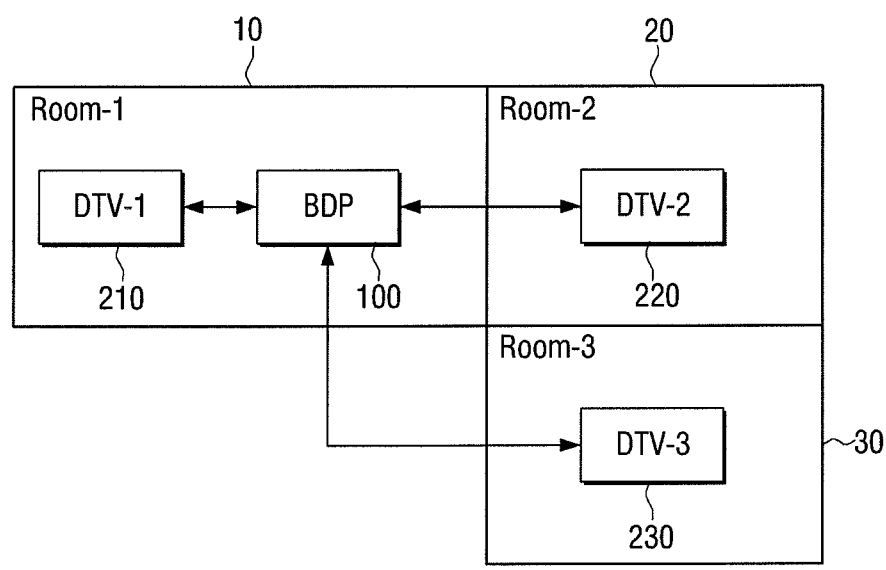
FIG. 1 is a drawing of a home network to which exemplary embodiments are applicable.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure the exemplary embodiments with unnecessary detail.

1. Home Network to which the Present Invention is Applicable

FIG. 1 illustrates a home network to which exemplary embodiments are applicable. The home network in FIG. 1 comprises 1) a Blu-ray Disk Player (BDP) 100 and a DTV-1 210 located in a Room-1 10, 2) a DTV-2 220 located in a Room-2 20, and 3) a DTV-3 230 located in a Room-3 30.

The BDP 100 is a kind of source device which provides contents recorded in a Blu-ray (BD). The DTVs 210, 220, 230 are kinds of sink devices which output contents provided by the BDP 100 working as a source device and provide the contents for a user.

The DTVs 210, 220, 230 are connected to the BDP 100 to communicate with each other. Accordingly, contents and a control command/request can be transmittable between the DTVs 210, 220, 230 and the BDP 100.

In detail, the BDP 100 can send contents generated by playing a BD to the DTVs 210, 220 230. Moreover, the BDP 100 can generate a command/request to control the DTVs 210, 220, 230 and send it to the DTVs 210, 220, 230. Moreover, a control command on the BDP 100 can be input into the DTVs 210, 220, 230 by a user and can be sent to the BDP 100.

2. BDP Detailed Configuration

Figure 2:
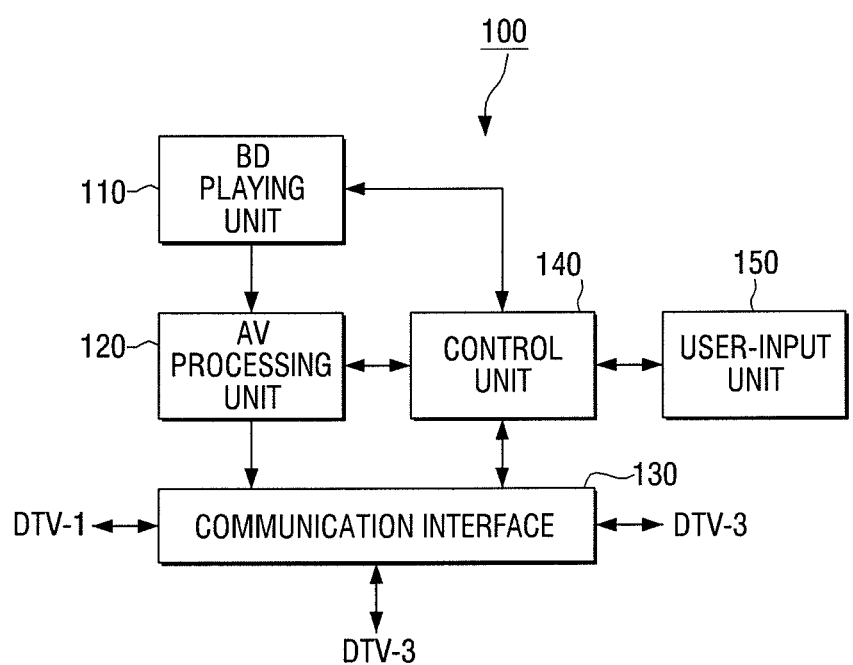
FIG. 2 is a detailed block diagram of a Blu-ray Disk Player (BDP) illustrated in FIG. 1.

FIG. 2 is a detailed block diagram of the BDP 100 illustrated in FIG. 1. As illustrated in FIG. 2, the BDP 100 comprises a BD playing unit 110, an audio/video (AV) processing unit 120, a communication interface 130, a control unit 140, and a user-input unit 150.

The BD playing unit 110 reads content data recorded on the BD and sends it to the AV processing unit 120.

The AV processing unit 120 performs necessary signal processing on the content data sent from the BD playing unit 110. In detail, the AV processing unit 120 decompresses the content data sent from the BD playing unit 110. Moreover, the AV processing unit 120 can also separate the decompressed content into a video signal and an audio signal.

The communication interface 130 is connected to the previously-mentioned DTVs 210, 220, 230 to communicate with each other. A content control command/request is exchanged between the BDP 100 and the DTVs 210, 220, 230 through the communication interface 130.

The control unit 140 controls the functions of the BDP 100 in general based on 1) a control command input from the user-input unit 150, or 2) a control command received from the DTVs 210, 220, 230 through the communication interface unit 130.

The control command '1)' refers to a control command directly input by a user into the BDP 100 unit to control the BDP unit 100. The control command '2)' refers to a control command indirectly input by a user through the DTVs 210, 220, 230, to control the BDP unit 100.

Particularly, the control unit 140 controls the BDP 100 and the DTVs 210, 220, 230 to ensure that one DTV, which is a sink device where the contents read by the BD playing unit 110 and signal processed by the AV processing unit 120 are output, can be changed to a different DTV where contents can be output.

In detail, the control unit 140 controls a sink device which outputs contents, wherein the sink device can be changed, or converted among the DTVs 210, 220, 230.

3. Sink Device Conversion Process #1

Sink device conversion is performed based on the command of a user. A process where the control unit 140 controls a sink device conversion, if a user commands a sink device to be converted from the DTV-1 210 to the DTV-2 220, will be explained in detail with reference to FIG. 3.

Figure 3:
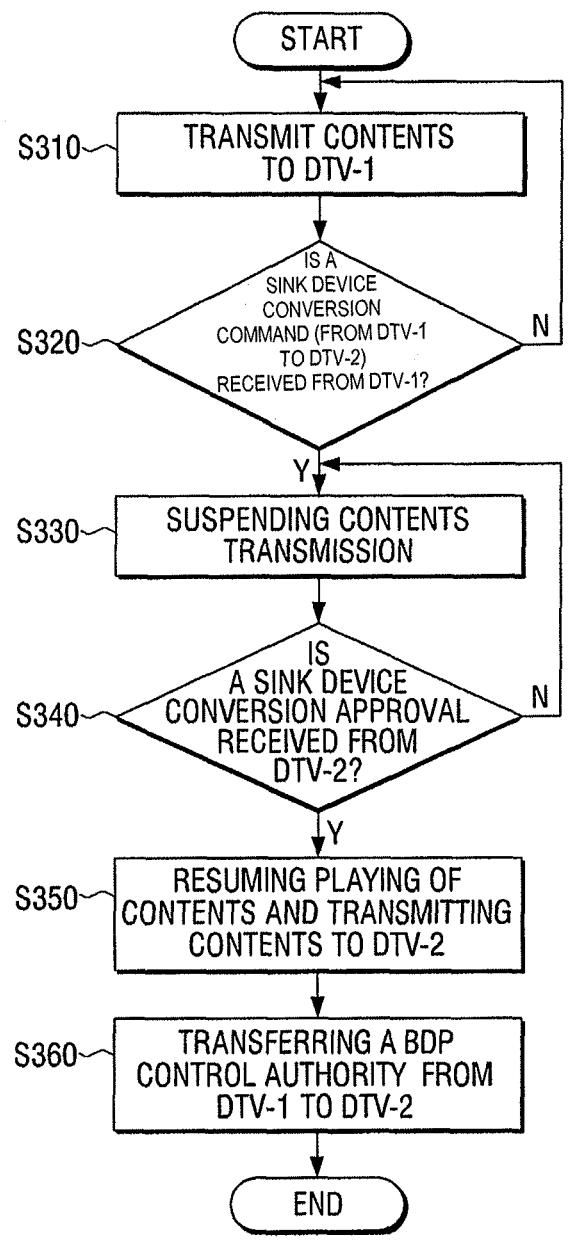
FIG. 3 is a flow chart provided to explain a sink device conversion method according to an exemplary embodiment.

FIG. 3 is a flow chart provided to explain a sink device conversion method according to an exemplary embodiment. A sink device conversion command is input by a user through the sink device DTV-1 210 where contents are being output, and is sent to the BDP 100.

As illustrated in FIG. 3, if a sink device conversion command (from the DTV-1 to the DTV-2) is received from DTV-1 (210) (S320-Y) while contents are being transmitted to the DTV-1 210 (S310), the control unit 140 suspends the ongoing content transmission which has been going on in operation S310. (S330)

In operation S330, content playing/transmission is suspended automatically in the BDP 100, and outputting is suspended automatically in the DTV-1 210.

To resume the content playing/transmitting and outputting, the user needs to move from Room-1 to Room-2 and input a sink device conversion approval into the DTV-2 220. The DTV-2 220 sends the sink device conversion approval input by the user, to the BDP 100.

When the sink device conversion approval is received from the DTV-2 220 (S340-Y), the control unit 140 controls the BD playing unit 110 and the AV processing unit 120 to resume the playing of contents. The control unit 140 controls the communication interface unit 130 to transmit the played contents to the DTV-2 220 (S350.)

If a sink device conversion approval is received from the DTV-2 220 (S340-Y), it means that the user is ready to watch the contents through the DTV-2 220.

Content transmission in operation S350 takes place after the moment when the transmission is suspended in operation S330; i.e., to enable a user to watch the contents seamlessly.

Since then, the control unit 140 transfers a BDP control authority from the DTV-1 210 to DTV-2 220 (S360.) The DTV, which has the control authority, is a DTV where a user command on the BDP unit 100 such as commands to play, pause, fast forward and rewind a content in the BDP 100 are input.

The control authority is transferred from the DTV-1 210 to DTV-2 220. Therefore, a user can input a command about the BDP unit 100 through the DTV-2 220, not through the DTV-1 210. Accordingly, the BDP unit 100 receives a command related to the performance of its functions from the DTV-2 220, not from the DTV-1 210.

4. Sink Device Conversion Process #2

Thus far, a case has been described where a user inputs a sink device conversion approval into the DTV which is commanded to be converted into a sink device. In other words, the case has been described that, 1) after a user commands to convert a 'sink device from the DTV-1 210 to the DTV-2 220, 2) a user inputs a sink device conversion approval into the DTV-2 220 after moving to the Room-2.

However, a case can occur where a user inputs a sink device conversion approval into another DTV, not the DTV which is commanded by a user to convert a sink device, because of ignorance or misunderstanding of the user. For example, 1) a user commands to covert a sink device from the DTV-1 210 to the DTV-2 220, 2) but the user misidentifies the DTV-3 230 located in the Room-3 as the DTV-2 220, thus moving to the Room-3 and inputting a sink device conversion approval into the DTV-3 230.

In this case, the control unit 140 receives a sink device conversion approval from the DTV-3 230, not from the DTV-2 220. In such a case, a process of sink device conversion approval will be explained below in detail.

Figure 4:
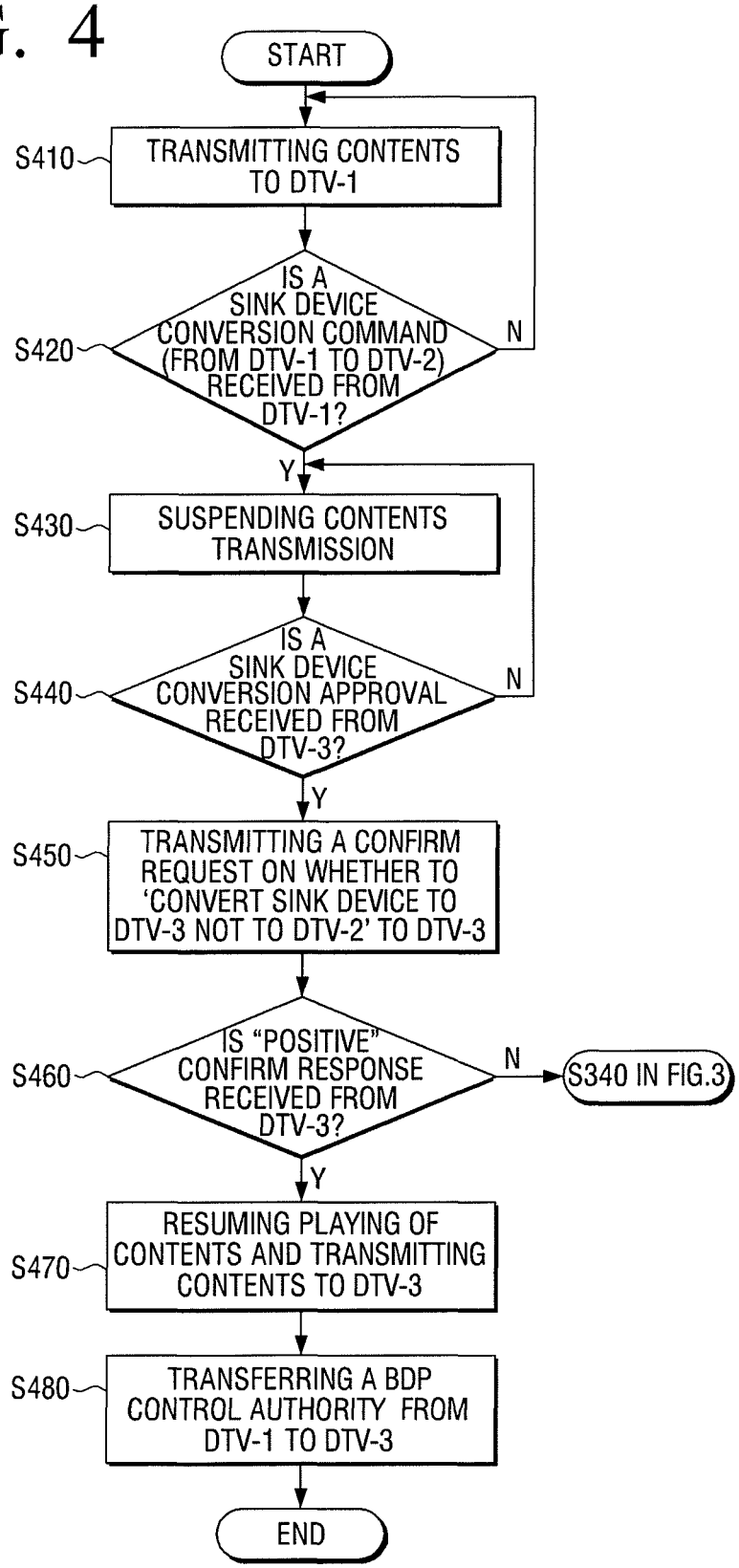
FIG. 4 is a flow chart provided to explain a sink device conversion method according to another exemplary embodiment.

Detailed explanation on operation S410 or operation S430 in FIG. 4 can be inferred from the explanation on operation S310 or S330 illustrated in FIG. 3, and is omitted.

A sink device conversion approval is received from the DTV-3 230, not from the DTV-2 220, the control unit 140 transmits a request for confirmation on, whether to convert a sink device to the DTV-3 230 not to the DTV-2 220, to the DTV-3 230 (S450).

The DTV-3 330, which receives the conversion confirm request transmitted in operation S450, displays a text message on a display to ask whether to 'convert a sink device to the DTV-3 230, not to the DTV-2 220.' The DTV-3 330 receives a response from a user about the message and sends it in response to the confirm request from the BDP 100.

If a "positive" confirm response is received from the DTV-3 230 (S460-Y), the control unit 140 controls the BD playing unit 110 and the AV processing unit 120 to resume the playing of contents, and controls the communication interface unit 130 to send the played contents to the DTV-3 230 (S470).

If a confirm response is received from the DTV-3 230, a user confirms that a sink device has been converted to the DTV-3 230, not to the DTV-2 220. Thus, the contents are transmitted to the DTV-3 230 in operation S470.

Afterwards, the control unit 140 transfers a control authority on the BDP 100 from the DTV-1 210 to the DTV-3 230 (S480). Accordingly, the BDP 100 receives a command related to its functions from the DTV-3 230, not from the DTV-1 210.

If a "negative" confirm response is received from the DTV-3 230 (S460-N), the control unit 140 performs operation S340 in FIG. 3. Accordingly, if a sink device conversion approval is received from the DTV-2 220 (S340-Y), the control unit 140 performs operations S350 and S360.

5. Automatic Power Management

After operation S330 in FIG. 3 and operation S430 in FIG. 4, the control unit 140 can transmit a 'power turn-off' command to the DTV-1 310. That is to automatically turn off the power of the DTV-1 310 where contents will not be output, because the content output is suspended now.

After operation S330 in FIG. 3 or operation S430 in FIG. 4, the control unit 140 can transmit a 'power turn-on' command to the DTV-2 320. That is to automatically turn on the power of the DTV-1 310 where the contents will be output.

6. Providing Contents Separately

In the above examples, contents are output through one DTV. However, that is just an example. Accordingly, it is possible to realize that the contents can be transmitted to more than two sink devices and be output. For example, the contents, which were output from the DTV-1 210, can be transmitted to both of DTV-2 220 and DTV-3 230 and be output.

Figure 5:
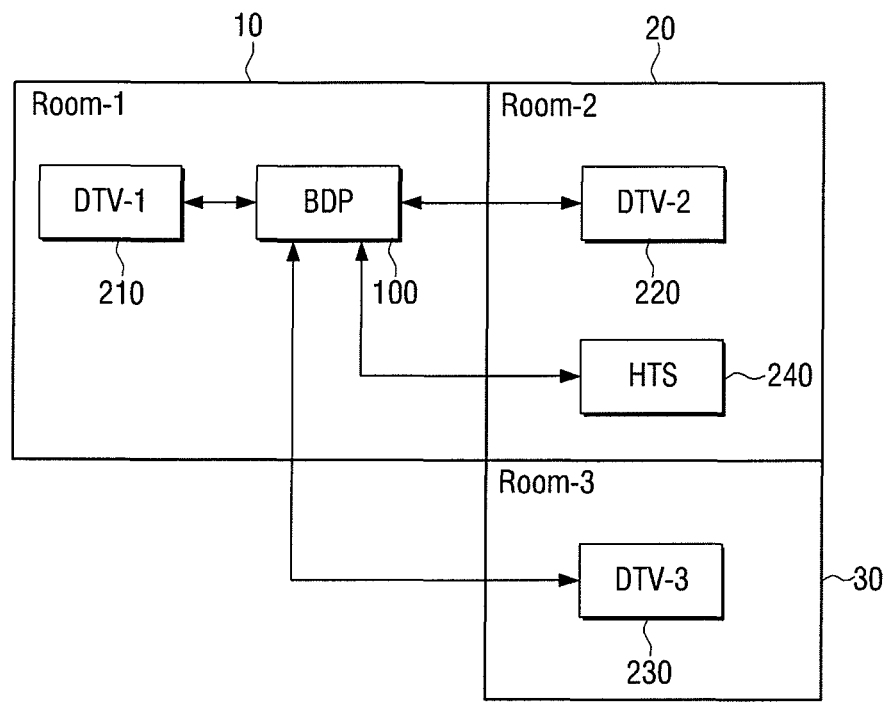
FIG. 5 is a drawing of another home network to which exemplary embodiments are applicable.

Moreover, a video signal and a audio signal contained in the contents can be transmitted to respective sink devices and be output. For example, as illustrated in FIG. 5, under the home network, the BDP 100 can separate the contents into a video signal and an audio signal, 1) send the video signal to the DTV-220, and 2) the audio signal to a HTS (Home Theater System) 240. In this case, a user can watch a video through the DTV-2 220 in the Room-2, and listen to an audio through the HTS 240.

7. Variations (1) Network

The home networks in FIG. 1 and FIG. 5 are examples of networks to which exemplary embodiments are applicable. Exemplary embodiments are not limited to the illustrated home network and can also be applicable to a different network from the illustrated one.

The devices mentioned in the home network assumed can be connected by a physical connection, but that is just an example for a better explanation. They can also be connected in a wireless manner.

(2) Source Device, Sink Device

The BDP mentioned in the above examples is a kind of source device and can be replaced with other kinds of devices other than the BDP. DTV and HTS are kinds of sink devices, therefore they can also be replaced with other kinds of devices.

As explained thus far, according to exemplary embodiments, a user can suspend the contents being transmitted to a sink device, transmit the contents to another sink device which the user wants, and change the sink device that outputs the contents. Accordingly, the user can convert the sink device to be provided with the contents, freely, so that the user enjoys more convenience.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A sink device swapping method of a plurality of sink devices, each of which is capable of outputting a content transmitted from a source device, the method comprising:
   the source device receiving a sink device recipient swapping command from a first sink device which receives contents provided from the source device;
   the source device receiving a sink device recipient swapping approval from a predetermined second sink device;
   suspending the transmission of the content to the first sink device after the receiving operation that indicates swapping approval;
   transmitting the content to the predetermined second sink device;
   transmitting a control authority related to a content provision from the first sink device to the second sink device;
   transmitting a turn-off request to the first sink device after the suspending operation, wherein the turn-off request relates to automatically turning off power to the first sink device; and
   transmitting a turn-on request to the second sink device after the receiving operation, wherein the turn-on request relates to automatically turning on power to the second sink device.

2. The sink device swapping method as claimed in claim 1, wherein the transmitting includes transmitting the content after the transmission is suspended in the suspending operation.

3. The sink device swapping method as claimed in claim 1, wherein the sink device recipient swapping command is a command which makes the source device swap from the first sink device to the second sink device and transmit the content to the second sink device.

4. The sink device swapping method according to claim 1, wherein the source device is a content-play device which plays contents including at least one of a video signal and an audio signal, and the plurality of sink devices comprise a video device and an audio device,
   wherein the transmitting the content comprises separating the content into a video signal and an audio signal; transmitting the video signal into the video device; and transmitting the audio signal into the audio device.

5. A content-providing apparatus which transmits data to a sink device which is capable of outputting a content comprising:
   a communication interface which enables communication between said content providing apparatus and at least a first sink device and a second sink device, each of which is capable of outputting a content; and
   a control unit which receives a sink device recipient swapping command from the first sink device which receives contents provided from the source device through the communication interface, receives a sink device recipient swapping approval from the predetermined second sink device,
   suspends content transmission to the first sink device if the sink device recipient swapping command is received from the first sink device,
   transmits the content to the predetermined second sink device through the communication interface and transfers a control authority related to a content provision from the first sink device to the second sink device,
   wherein the control unit transmits a turn-off request to the first sink device through the communication interface after suspending the content transmission to the first sink device, wherein the turn-off request relates to automatically turning off power to the first sink device, and
   wherein the control unit transmits a turn-on request to the second sink device through the communication interface if the sink device recipient swapping command is received from the first sink device, wherein the turn-on request relates to automatically turning on power to the second sink device.

6. The content-providing apparatus as claimed in claim 5, wherein the control unit transmits the content to the second sink device through the communication interface, after the transmission was suspended.

7. The content-providing apparatus as claimed in claim 5, wherein the sink device recipient swapping command is a command which makes the content-providing apparatus swap from the first sink device to the second sink device and transmit the content to the second sink device.

8. The content-providing apparatus according to claim 5, wherein the content includes at least one of a video signal and an audio signal, the second sink device includes a video device and an audio device, and the control unit transmits the video signal separated from the content to the video device through the communication interface and transmits the audio signal to the audio device through the communication interface.

* * * * *